US012618950B2

(12) United States Patent
Zhou et al.

(10) Patent No.: US 12,618,950 B2
(45) Date of Patent: May 5, 2026

(54) PHOTOMULTIPLIER TUBE PROTECTION SYSTEM WITH DUAL OPTICAL RECEIVING CHANNELS FOR BATHYMETRY LiDAR

(71) Applicant: GUILIN UNIVERSITY OF TECHNOLOGY, Guilin (CN)

(72) Inventors: Guoqing Zhou, Guilin (CN); Zhong'ao Wang, Guilin (CN)

(73) Assignee: GUILIN UNIVERSITY OF TECHNOLOGY, Guilin (CN)

( * ) Notice: Subject to any disclaimer, the term of this patent is extended or adjusted under 35 U.S.C. 154(b) by 168 days.

(21) Appl. No.: 18/798,249

(22) Filed: Aug. 8, 2024

(65) Prior Publication Data

US 2025/0389822 A1     Dec. 25, 2025

(51) Int. Cl.
*G01S 7/4861* (2020.01)
*G01S 17/00* (2020.01)
*G01S 17/89* (2020.01)

(52) U.S. Cl.
CPC .......... *G01S 7/4861* (2013.01); *G01S 17/006* (2013.01); *G01S 17/89* (2013.01)

(58) Field of Classification Search
CPC ....... G01S 17/89; G01S 17/006; G01S 7/4861
See application file for complete search history.

(56) References Cited

U.S. PATENT DOCUMENTS

2017/0067997 A1* 3/2017 Mullen .................. G01S 17/89
2021/0278541 A1* 9/2021 Thoren ................ G01S 7/4817
2022/0206128 A1* 6/2022 Hopper .................. G01S 17/89

FOREIGN PATENT DOCUMENTS

CN       201063436 Y     5/2008
CN       201434908 Y  *  3/2010
(Continued)

OTHER PUBLICATIONS

Kai et. al., "Study on Airborne Laser Bathymetric System Receiver Field of View," Acta Optica Sinica 35(7):0701005. (Year: 2015).*
(Continued)

*Primary Examiner* — Yuqing Xiao
*Assistant Examiner* — Zhengqing Qi
(74) *Attorney, Agent, or Firm* — Bochner PLLC; Andrew D. Bochner

(57)       ABSTRACT

A photomultiplier tube protection system with dual optical receiving channels for bathymetry LiDAR is designed, through a photomultiplier tube gating technology, based on dual optical receiving channels, main control module with STM32 single chip microcomputer and, high-speed AD sampling module. The system includes: calculating laser echo receiving power ratios of different optical receiving channels, respectively; acquiring, by AD sampling module, laser echo signal, and performing peak determination on acquired data, and transmitting peak information to the main control module; and collecting, by the main control module, echo signal intensity information, performing photomultiplier tube gating control according to the received echo signal intensity and the calculated echo receiving efficiency ratios of different optical receiving channels, and stopping the photomultiplier tube through photomultiplier tube gating control if saturated echo signal occurs, and adjusting external laser device power, thus achieving multiple protection of the photomultiplier tube.

1 Claim, 3 Drawing Sheets

(56) References Cited

FOREIGN PATENT DOCUMENTS

| | | | | | |
|---|---|---|---|---|---|
| CN | 101776751 | A | * | 7/2010 | |
| CN | 204089876 | U | * | 1/2015 | |
| CN | 106712758 | A | * | 5/2017 | ............ H03K 17/78 |
| CN | 106712758 | B | | 5/2017 | |
| CN | 206505004 | U | | 9/2017 | |
| CN | 113671526 | A | * | 11/2021 | ............ G01S 7/486 |
| CN | 116165694 | A | | 5/2023 | |

OTHER PUBLICATIONS

Machine translation of Kai et. al., "Study on Airborne Laser Bathymetric System Receiver Field of View," Acta Optica Sinica 35(7): 0701005. (Year: 2015).*
Machine translation of CN101776751A (Year: 2010).*
Machine translation of CN106712758A (Year: 2017).*
Machine translation of CN113671526A (Year: 2021).*
Machine translation of CN201434908Y (Year: 2010).*
Machine translation of CN204089876U (Year: 2015).*
Chao, S. et al., "Design of EAST-NBI Photomultiplier Tube Interlock Protection System", Nuclear Electronics and Detection Technology, vol. 39 Issue No. 4, pp. 446-451, Jul. 2019.

* cited by examiner

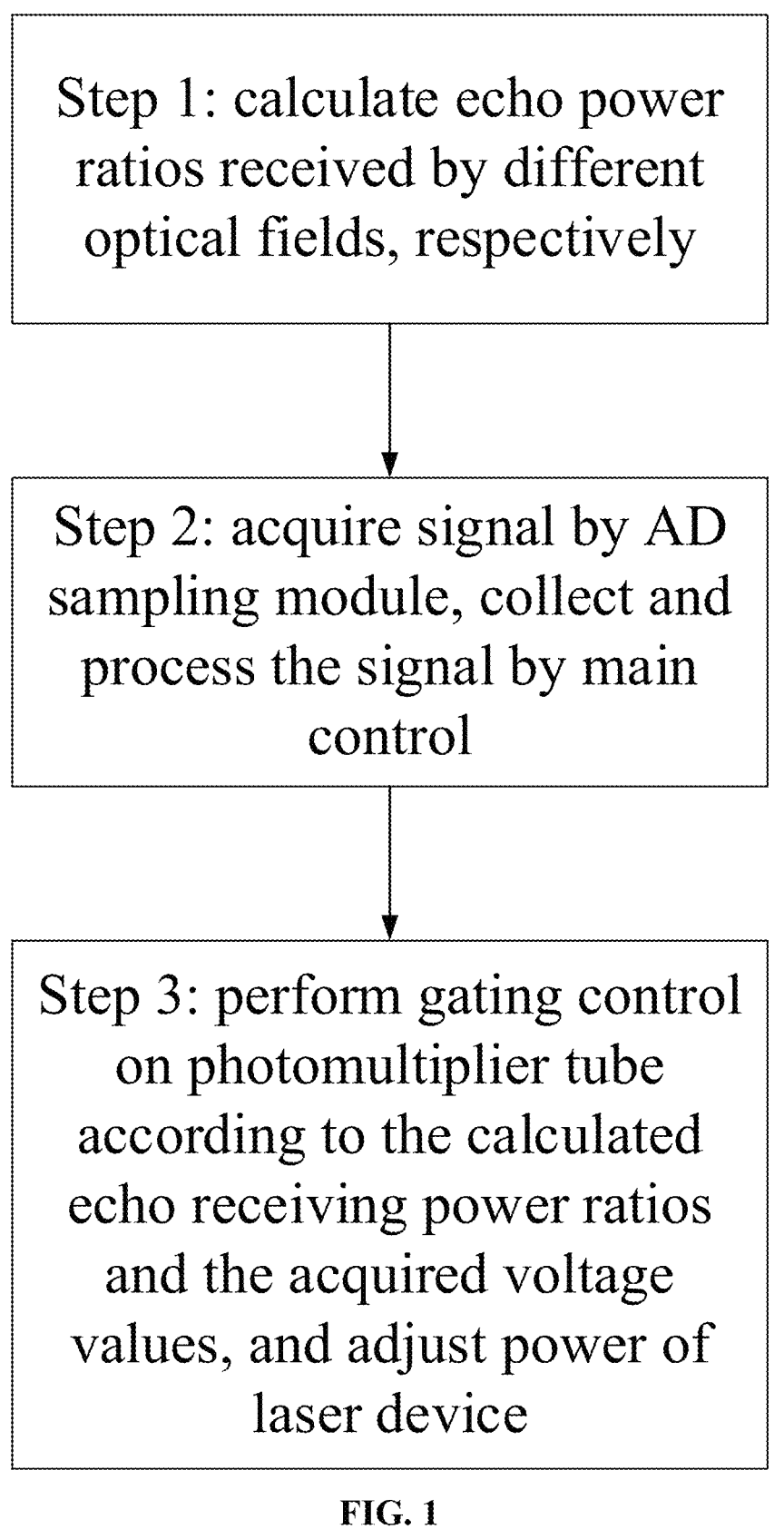

Step 1: calculate echo power ratios received by different optical fields, respectively Step 2: acquire signal by AD sampling module, collect and process the signal by main control Step 3: perform gating control on photomultiplier tube according to the calculated echo receiving power ratios and the acquired voltage values, and adjust power of laser device

FIG. 1

PHOTOMULTIPLIER TUBE PROTECTION SYSTEM WITH DUAL OPTICAL RECEIVING CHANNELS FOR BATHYMETRY LiDAR

CROSS-REFERENCE TO RELATED APPLICATION

This patent application claims the benefit and priority of Chinese Patent Application No. 202311809784.8 filed with the China National Intellectual Property Administration on Dec. 26, 2023, the disclosure of which is incorporated by reference herein in its entirety as part of the present application.

TECHNICAL FIELD

The present disclosure relates to the field of LiDARs (Light Detection and Rangings), and in particular to a photomultiplier tube protection system with dual optical receiving channels for a bathymetry LiDAR.

BACKGROUND

At present, in the reception of echo signals with a bathymetry LiDAR, photomultiplier tube is usually used to detect laser echo signals. The photomultiplier tube is a detector for converting weak optical signals into electrical signals. The operating principle is that when photons reach the photocathode surface through an incident window, photons on the photocathode surface are excited to release photoelectrons into the vacuum, and the photoelectrons are multiplied and amplified by the electronic dynodes. Finally, the secondary electrons emitted by the terminal dynode are output through the anode to convert the optical signals into electrical signals. As a high-sensitivity light-sensing component, the operating state of the photomultiplier tube may be affected by an incidence of strong light such as laser, which may saturate the system output, and even damage the photomultiplier tube. At present, the conventional protection method is to block strong light using a mechanical shutter, but its response speed is slow, and the durability is short. Therefore, an electronic gating function is usually designed in the photomultiplier tube, which is used to control photoelectrons by adjusting the voltage between electrodes, thus achieving high gated extinction rate at a high speed state and effectively preventing anode current from exceeding the maximum rating of the photomultiplier tube. In the operating process of LiDAR, sometimes it is unavoidable to produce strong laser echo signals. If the strong echo signals cannot be processed accurately and quickly, the photomultiplier tube would be irreversibly damaged.

Patent application No. CN2023103729506 has disclosed a photomultiplier tube protection device for a space-borne particle detector. A physical protection groove is designed for installing a photomultiplier tube in an adaptive manner, such that the device wraps the photomultiplier tube by means of physical protection to achieve protection effect. However, the internal circuits of the photomultiplier tube cannot be protected.

Patent application No. CN206505004U has disclosed a protection device for a photomultiplier tube. The device extends the service life of photomultiplier tube by designing a physical structure of a block at a light inlet of the photomultiplier tube. The block can selectively shield or expose the light inlet by being moved horizontally to prevent the photomultiplier tube from being damaged due to long-term contact with strong light. However, the effect of strong light shielding by the physical block is low, and the service life of the protection device is also shortened. Meanwhile, the device requires a probe to shield the light inlet of the photomultiplier tube in a non-detection state, and a protection state cannot be adjusted in the operating state.

Patent application No. CN106712758B has disclosed a control circuit of a gated photomultiplier tube. The photocathode and dynode voltages of the first three stages of the photomultiplier tube are controlled by the photomultiplier tube gating technology, so as to control the operating state of the photomultiplier tube. By adjusting the switch and duration of a gating circuit, the photomultiplier tube can be avoided from the strong interference pulse or white background signal reached first in detection, thus achieving effective detection of a weak signal to be detected. However, only the operating state of the photomultiplier tube can be controlled, and the current operating environment cannot be analyzed to control and adjust the opening and closing of the photomultiplier tube in real time, the photomultiplier tube cannot even be protected.

Patent application No. CN201063436Y has disclosed a photomultiplier tube protection device, including a sensor and a control circuit. A photoelectric switch is used to control a high-voltage circuit of the photomultiplier tube. When the photoelectric switch detects that a light intensity reaches a threshold, an operating voltage of the photomultiplier tube is immediately cut off to prevent the photomultiplier tube from being damaged when strong light appears. Meanwhile, the maximum light leakage intensity can be set, and the high-voltage circuit can be turned only in a case of lowering than the light intensity so that the photomultiplier tube can operate. However, a circuit for determining the light intensity is relatively simple, the echo signal intensity cannot be completely analyzed, the adaptability for different operating environment is low, and it cannot be adaptively adjusted for the operating environment accordingly.

In 2019, a protection method was proposed in "Design of EAST-NBI Photomultiplier Tube Interlock Protection System" published in Nuclear Electronics and Detection Technology by Shi Chao et al. from the Institute of Plasma Physics of Chinese Academy of Sciences, where the photomultiplier tube protection was designed as external protection and self-protection. External protection is to control a trigger signal from an interruption beam and cut off the injection of a neutral beam injector when the optical signal intensity of stray particles exceeds a set value. Self-protection is a power-off protection mechanism to prevent the photomultiplier tube from being damaged by sudden high-power light intensity. However, in this paper, the design mechanism for photomultiplier tube is simply turned off, instead of being effectively used for gating control for protection, and thus, instead of autonomously adjusting the current operating environment to make the system work safely, the light outlet is simply turned off.

Although in the above applications and paper, the protection methods for photomultiplier tubes have been designed from different perspectives, there is no analysis on the receiving efficiency of the photomultiplier tube in the corresponding operating environment from the perspective of an optical receiving system. They failed to design a related protection system by means of different receiving efficiency, by reasonably utilizing the speed advantage and durability advantage of the gating function of the photomultiplier tube, and by reasonably utilizing the collected light signal intensity information for adjusting the light source. There is also a lack of a photomultiplier tube protection system specifically for a bathymetry LiDAR. In view of the above problems, the disclosure provides a photomultiplier tube protection system with dual optical receiving channels for the bathymetry LiDAR. Different gating modes of photomultiplier tubes are designed for different optical receiving channels, and the receiving efficiency and correlation of different optical receiving channels in the system are mainly analyzed, and the operating state of photomultiplier tube is controlled by corresponding gating modes, and the feedback adjustment of the laser power is achieved. The photomultiplier tube is prevented from being damaged by the strong echo signal, and the active control of the laser intensity under the operating environment of the photomultiplier tube can be achieved, thus achieving the protection of the photomultiplier tube with dual optical receiving channels for the bathymetry LiDAR.

SUMMARY

A photomultiplier tube protection system with dual optical receiving channels for a bathymetry LiDAR is provided. The system is mainly composed of a laser device, dual optical receiving channels, a first photomultiplier tube and a first back-end processing circuit, a second photomultiplier tube and a second back-end processing circuit, a high-speed AD (analog-digital) sampling module, and a main control module.

The protection system analyzes optical receiving efficiency of different optical receiving channels, and the high-speed AD sampling module monitors an echo signal peak and transmits the echo signal peak to the main control module. The main control module collects and analyzes the peak signal transmitted by the high-speed AD sampling module. When the laser echo signal is oversaturated or about to be saturated, the photomultiplier tube is turned off by gating control, and the energy of the laser device is turned down. Meanwhile, according to the calculated optical receiving efficiency ratios of different optical receiving channels, for the photomultiplier tube connected to a strong light channel with strong laser echo receiving ability, the main control module first calculates and determines, based on the calculated receiving efficiency ratios, whether the photomultiplier tube is operating in the risk of damage when the strong light channel is in the current operating environment according to echo peak data of a weak optical channel with weak laser echo receiving ability currently acquired by the high-speed AD sampling module. When it is determined that the current environment is safe, a gating control signal is input to the photomultiplier tube connected to the strong light channel to allow the photomultiplier tube to enter an operating state. When it is determined that there is the risk of damage, the laser energy is turned down to achieve the effect of preprotection. Therefore, the protection system can prevent the photomultiplier tube from saturation output and being damaged by high-power laser.

The photomultiplier tube protection system with dual optical receiving channels for the bathymetry LiDAR includes the following operations:

Step 1, laser echo receiving power ratios of different optical receiving channels are calculated, respectively; an output current of a photomultiplier tube is calculated using Formula (1):

$$I_f = P_p * S_p * G_s \tag{1}$$

where $I_f$ denotes the output current of the photomultiplier tube, $S_p$ denotes sensitivity of a photocathode surface of the photomultiplier tube, $P_p$ denotes received optical power of the photomultiplier tube after light is attenuated in environment, and $G_s$ denotes a bias voltage of the photomultiplier tube;

a received echo power of the optical receiving channel is expressed by Formula (2):

$$P_p = P_b(h) + P_s(h) \tag{2}$$

where $P_b(h)$ is water-bottom echo power, and $P_s(h)$ is water-body backscattering power.

backscattered laser echo signal receiving powers of water bottom and water body can be calculated by Formula (3) and Formula (4), respectively:

$$P_b(h) = P_i \frac{\rho_b}{\pi} \sum \eta \frac{\cos^2 \theta_w}{(H+h)^2} e^{\left[\frac{-2(a+b_b)}{\cos\theta_w}\right]} F(h) \tag{3}$$

$$P_s(h) = P_i \frac{c\tau_p}{2n} \beta \sum \eta \frac{\cos^2 \theta_w}{(H+h)^2} e^{\left[\frac{-2(a+b_b)}{\cos\theta_w}\right]} F(h) \tag{4}$$

where $P_b(h)$ is seabed echo signal power, h is a water depth, $P_i$ is laser peak power, $\rho_b$ is water-bottom reflectivity, $\Sigma$ is an aperture area of a receiving field, $\eta$ is receiving efficiency of the optical receiving channel, $\theta_w$ is an included angle between a propagation direction and a vertical direction after laser enters the seawater, H is an equivalent flight altitude, a is an absorption coefficient of the water body, $b_b$ is a backscattering coefficient of the water body, F(h) is a field loss factor, $\tau_p$ is a laser pulse width, n is a refractive index of the water body, $\beta_\pi$ is a value when a volume scattering function $\beta(\theta)$ is 180°.

According to a design of the optical receiving channel, LiDAR echo signal receiving efficiency ratios of different optical receiving channels are calculated in combination with Formula (1), Formula (2), Formula (3) and Formula (4).

Step 2, an echo signal received by the optical receiving channel is transmitted to the high-speed AD (analog-digital) sampling module after passing through the photomultiplier tube and a back-end processing circuit, and the AD sampling module is configured to perform peak determining on acquired data by designing a peak module, and to transmit peak information to the main control module;

an attenuator in the back-end circuit is configured to attenuate a signal acquired by the photomultiplier tube to a threshold range acquired by the AD sampling module, and voltage conversion of the attenuator can be expressed by Formula (5);

$$20 lg\left(\frac{U_i}{U_o}\right) = B \tag{5}$$

where $U_i$ denotes an input voltage, $U_o$ denotes an output voltage, and B is an attenuation amount.

An acquisition voltage of the AD sampling module ranges from −0.85 v to +0.85 v, the number of conversion bits is 14, and a corresponding analog-to-digital conversion formula is expressed by Formula (6):

$$\frac{V_i}{V_o} = \frac{D_o}{2^{16-1}} \quad (6)$$

where $V_i$ is the acquisition voltage, $V_o$ is the range of the acquisition voltage, $D_o$ is a converted value after acquisition; a peak determination module is designed in the high-speed AD sampling module to match a laser pulse period, to record the converted value after acquisition in each clock cycle of the high-speed AD sampling module, and compare the converted value with a value in a previous clock cycle to record a maximum value; when all values in the complete laser pulse period are compared, a resultant maximum value is transmitted to the main control module of the photomultiplier tube protection system through a serial port as echo signal intensity information of the protection system.

Step 3, after receiving the echo signal intensity information, according to the calculated echo receiving efficiency ratios of different optical receiving channels, the main control module performs a precalculation on an echo signal intensity acquired by a second photomultiplier tube and a second back-end processing circuit, connected to the strong light channel, in a current operating state. When it is determined that the photomultiplier tube is able to operate in a normal operating state, a gating start signal is input to the second photomultiplier tube to make the second photomultiplier tube operate as normal; when it is determined that the photomultiplier tube is in danger of damage, the gating start signal is prohibited from being input, and laser energy is turned down. During operation, current echo signal intensities acquired by a first photomultiplier tube and a first back-end processing circuit as well as the second photomultiplier tube and the second back-end processing circuit are detected in real time, and when a saturated echo signal occurs, the input of the gating start signal is stopped, and an external laser intensity is adjusted to achieve multiple protection of the photomultiplier tube.

Through the system designed by the present disclosure, corresponding gating modes can be designed for different optical receiving channels, the gating control of the photomultiplier tube can be carried out according to the current operating environment. Meanwhile, the power of the laser device and the laser intensity can be adjusted, thus achieving photomultiplier tube protection with double optical receiving channels of the bathymetry LiDAR.

BRIEF DESCRIPTION OF THE DRAWINGS

FIG. 1 shows steps of a design method for a photomultiplier tube protection system according to the present disclosure;

DETAILED DESCRIPTION OF THE EMBODIMENTS

To make the objectives, technical solutions and advantages of the present disclosure more clearly, preferred embodiments are described below, and the specific embodiments of the present disclosure will be further described in detail in conjunction with the accompanying drawings.

Figure 2:
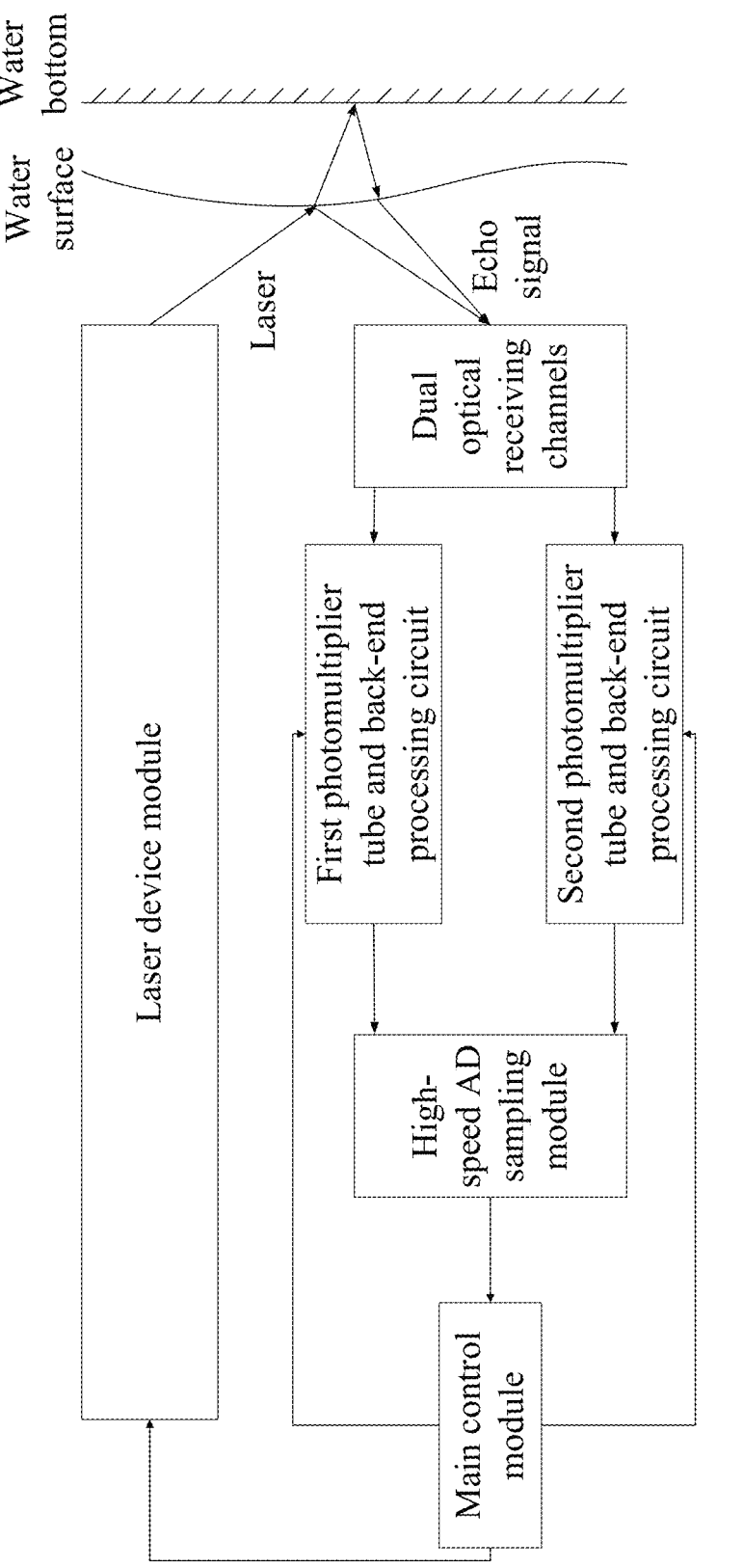
FIG. 2 is a block diagram of the photomultiplier tube protection system according to the present disclosure.

In conjunction with FIG. 2, the photomultiplier tube protection system provided by the present disclosure includes a laser device, dual optical receiving channels, a first photomultiplier tube and a first back-end processing circuit, a second photomultiplier tube and a second back-end processing circuit, a high-speed AD sampling module, and a main control module.

The laser device is as follows. The laser device has a repetition frequency of 2000 Hz, and can be connected to the main control module through a RS232 serial communication protocol. The laser power can be adjusted through the main control module.

The dual optical receiving channels are as follows. The optical receiving channels receive a laser echo signal through a field-splitting mirror, and enable the laser echo signal to enter the first photomultiplier tube and the first back-end processing circuit, and the second photomultiplier tube and the second back-end processing circuit. Combined with a mechanical structure, a main mirror has a main aperture of 100 mm and a focal length of 200 mm; the field-splitting mirror is a mirror which has a central opening and has a diameter of 10 mm. The mirror is located at a focal point of the main mirror, and has a central opening of 1.5 mm. A receiving image plane of the detector is 8 mm directly. In the system, an optical receiving channel, as a weak light channel, corresponding to the first photomultiplier tube, has a receiving field angle of 0 to 5 mrad, and an optical receiving channel, as a strong light channel, corresponding to the second photomultiplier tube, has a receiving field angle of 5 to 40 mrad.

The first photomultiplier tube and the first back-end circuit are as follows. Hamamatsu H11526-20-ON normally-on photomultiplier tube is used as the first photomultiplier tube. The first photomultiplier tube and the first back-end circuit receive a small-beam echo laser signal from the optical receiving channel and converts the small-beam echo laser signal into an electrical signal. The photomultiplier tube is normally on. The photomultiplier tube can be controlled to be turned off after a gating signal is input. The first back-end processing circuit is connected to the AD sampling module through an attenuator and a transmission circuit. The first photomultiplier tube is characterized that its receiving field angle is small, and its detection sensitivity is low.

The second photomultiplier tube and the second back-end circuit are as follows. Hamamatsu H11526-20-OF normally-off photomultiplier tube is used as the second photomultiplier tube. The second photomultiplier tube and the second back-end circuit receive a small-beam echo laser signal from the optical receiving channel and converts the small-beam echo laser signal into an electrical signal. The photomultiplier tube is normally off. The photomultiplier tube can be controlled to perform photoelectric conversion after a gating signal is input. The second back-end processing circuit is connected to an AD conversion module through an attenuator and a transmission circuit. The second photomultiplier tube is characterized that its receiving field angle is large, and its detection sensitivity is high.

The high-speed AD sampling module is as follows. The high-speed AD sampling module is achieved using FPGA (Field Programmable Gate Array) and an AD9208 analog-to-digital conversion chip. In this module, a channel 1 and a channel 2 receive electrical signals transmitted from the first photomultiplier tube and the first back-end circuit as well as the second photomultiplier tube and the second back-end circuit, respectively, and convert the electrical signals into digital signals. A peak module is designed in module program to match a laser pulse period, record a converted value after acquisition in each clock cycle of the high-speed AD sampling module, and compare the converted value with a value in a previous clock cycle to record a maximum value. When all values in the complete laser pulse period are compared, the resultant maximum value is transmitted to the main control module of the photomultiplier tube protection system through a serial port as echo signal intensity information of the protection system. The acquired maximum value is transmitted to the main control module through the serial port communication mode.

The main control module is as follows. An STM32 chip microcomputer is used as the main control module to determine whether the current sample peak of the photomultiplier tube has a breakdown risk by receiving the peak acquired by the high-speed AD sampling module, thus controlling the on/off of the photomultiplier tube gating, and controlling the power of the laser device.

Figure 3:
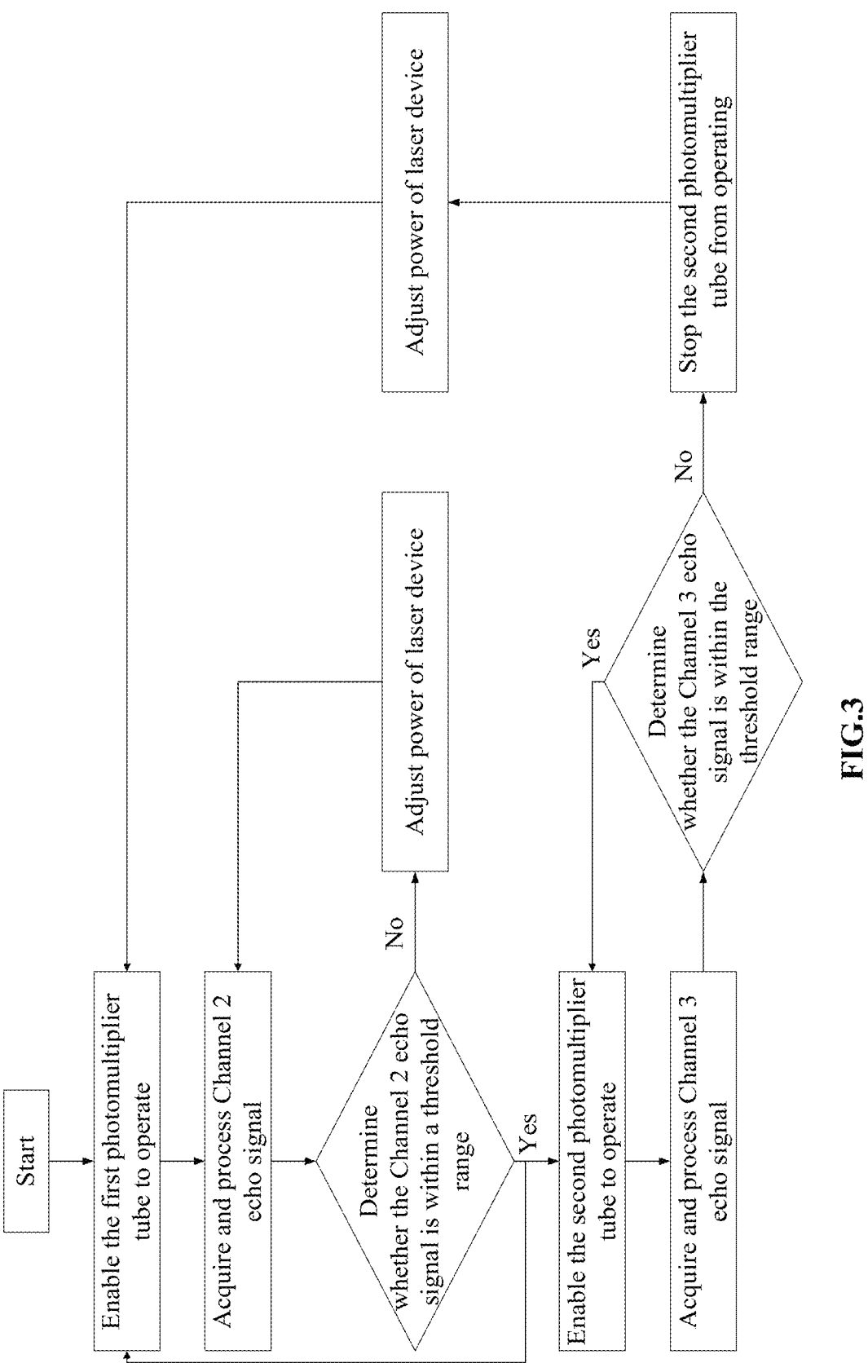
FIG. 3 is an operating flow chart of the photomultiplier tube protection system according to the present disclosure.

In conjunction with FIG. 3, the photomultiplier tube protection system with dual optical receiving channels for the bathymetry LiDAR executes the following steps:

Step 1: laser echo receiving power ratios of different optical receiving channels are calculated, respectively. The powers of receiving fields of the two channels under the same condition are calculated respectively by analyzing receiving aperture area of different optical receiving channels. The powers of the receiving fields of the two optical receiving channels are calculated in combination with Formula (1), Formula (2), Formula (3) and Formula (4).

Step 2: the acquired signals are transmitted to the high-speed AD sampling module through the back-end circuits, and the values obtained after sampling can be calculated by Formula (5) and Formula (6). Through Formula (6), according to the acquisition range 1.7 V of the AD sampling module, it can be calculated that the highest converted value after acquisition is 35,000. After the peak determining is conducted by the high-speed AD sampling module, the peak is transmitted to the main control module by serial port transmission, and the main control module collects the data returned by the AD sampling module, and sets a safety threshold of 34,000. According to the repetition frequency 2000 Hz of the laser, in a laser light-emitting period, the converted value after acquisition in each clock cycle of the high-speed AD sampling module is recorded and compared with the value of the previous clock cycle, the maximum value is recorded, and then is transmitted to the main control module.

Step 3: according to the calculated echo receiving efficiency ratios and the acquired peak data, the main control module performs the gating control on the first photomultiplier tube and second photomultiplier tube. Moreover, the power of the laser device is turned down if necessary.

In conjunction with FIG. 3, the photomultiplier tube protection system involved in the present disclosure is described. The operating state of the first photomultiplier tube is normally on. After the system works, a receiving optical channel receives a laser echo signal normally. After the photoelectric conversion is achieved by the photomultiplier tube, the high-speed AD sampling module collects and processes signal, a sampling channel 1 in the high-speed AD sampling module receives laser echo data currently received by the first photomultiplier tube, acquires the maximum echo peak data after conversion through a peak module, and sends the current peak back to the main control module. The main control module determines whether the current operating environment is in a safe state and whether there is a risk of damaging the photomultiplier tube due to strong laser echo. When it is determined that the current operating state is safe, that is, the echo peak is less than the set safety threshold, the first photomultiplier tube works as normal. When the echo peak is higher than the set safety threshold, a gating signal is output to the first photomultiplier tube. A gating signal is input to the first photomultiplier tube which is used as a normally-on photomultiplier tube, making the photomultiplier tube stop working. When the first photomultiplier tube is in a normal operating state, the echo signal intensity acquired by the second photomultiplier tube and the second back-end circuit working in the current environment is calculated through the calculated receiving power ratios of two optical field receiving channels. The main control module outputs the gating signal, and the second photomultiplier tube is a normally-off photomultiplier tube. After the gating signal is output, the photomultiplier tube starts to work. If there is a risk of damage, the main control module reduces the power of the laser device. After the gating signal is output to the second photomultiplier tube, the data currently collected by an optical channel is received by the second photomultiplier tube according to the channel 2 of the high-speed AD sampling module, and the current peak is sent back to the main control module. The main control module determines whether the current operating state poses a risk of damage to the photomultiplier tube through the sent peak. When the sent peak is greater than the set safety threshold, a gating signal is output immediately to turn off the photomultiplier tube, and the power of the laser device is reduced at the same time. Through the gating control of the photomultiplier tube and the power adjustment of the laser device, the dual protection for the photomultiplier tube can be achieved.

The above embodiments are only used to illustrate the present disclosure rather than limiting the present disclosure, and those of ordinary skilled in the art can make various changes and modifications without departing from the spirit and scope of the present disclosure. Therefore, all equivalent technical solutions also belong to the scope of the present disclosure, and the patent protection scope of the present disclosure should be defined by the claims.

The technical contents not described in detail in the present disclosure are all known art.

What is claimed is:

1. A method for operating a photomultiplier tube protection system with dual optical receiving channels for a bathymetry LiDAR, the method comprising the following operations:

step 1: calculating laser echo receiving power ratios of different optical receiving channels respectively; wherein, an output current of a photomultiplier tube is calculated using Formula (1):

$$I_I = P_p * S_p * G_s \tag{1}$$

wherein $I_I$ denotes the output current of the photomultiplier tube, $S_p$ denotes sensitivity of a photocathode surface of the photomultiplier tube, $P_p$ denotes received optical power of the photomultiplier tube after light attenuated in environment, and $G_s$ denotes a bias voltage of the photomultiplier tube;

a received echo power of the optical receiving channel is expressed by Formula (2);

$$P_p = P_b(h) + P_s(h) \qquad (2)$$

wherein $P_b(h)$ is water-bottom echo power, and $P_s(h)$ is water-body backscattering power;

backscattered laser echo signal receiving powers of water bottom and water body are calculated by Formula (3) and Formula (4), respectively:

$$P_b(h) = P_i \frac{\rho_b}{\pi} \sum \eta \frac{\cos^2 \theta_w}{(H+h)^2} e^{\left[\frac{-2(a+b_b)}{\cos\theta_w}\right]} F(h) \qquad (3)$$

$$P_s(h) = P_i \frac{c\tau_p}{2n} \beta \sum \eta \frac{\cos^2 \theta_w}{(H+h)^2} e^{\left[\frac{-2(a+b_b)}{\cos\theta_w}\right]} F(h) \qquad (4)$$

wherein $P_b(h)$ is seabed echo signal power, h is a water depth, $P_i$ is laser peak power, $\rho_b$ is water-bottom reflectivity, $\Sigma$ is an aperture area of a receiving field, $\eta$ is receiving efficiency of the optical receiving channel, $\theta_w$ is an included angle between a propagation direction and a vertical direction after laser enters seawater, H is an equivalent flight altitude, a is an absorption coefficient of the water body, $b_b$ is a backscattering coefficient of the water body, F(h) is a field loss factor, $\tau_p$ is a laser pulse width, n is a refractive index of the water body, $\beta_\pi$ is a value when a volume scattering function $\beta(\theta)$ is 180°;

according to a design of the optical receiving channel, LiDAR echo signal receiving efficiency ratios of different optical receiving channels are calculated in combination with Formula (1), Formula (2), Formula (3) and Formula (4);

step 2: transmitting an echo signal received by the optical receiving channel to a high-speed AD acquisition module after passing through the photomultiplier tube and a back-end processing circuit, performing peak determining on acquired data by an AD sampling module designing a peak module, and transmitting peak information to a main control module;

wherein, an attenuator in the back-end circuit is configured to attenuate a signal acquired by the photomultiplier tube to a threshold range acquired by the AD sampling module, and voltage conversion of the attenuator is expressed by Formula (5);

$$20lg\left(\frac{U_i}{U_o}\right) = B \qquad (5)$$

wherein $U_i$ denotes an input voltage, $U_o$ denotes an output voltage, and B is an attenuation amount;

an acquisition voltage of the AD sampling module ranges from −0.85 v to +0.85 v, a number of conversion bits is 14, and a corresponding analog-to-digital conversion formula is expressed by Formula (6):

$$\frac{V_i}{V_o} = \frac{D_o}{2^{16-1}} \qquad (6)$$

wherein $V_i$ is the acquisition voltage, $V_o$ is the range of the acquisition voltage, $D_o$ is a converted value after acquisition; a peak determination module is designed in the high-speed AD acquisition module to match a laser pulse period, to record the converted value after acquisition in each clock cycle of the high-speed AD acquisition module, and compare the converted value with a value in a previous clock cycle to record a maximum value; when all values in a complete laser pulse period are compared, a resultant maximum value is transmitted to the main control module of the photomultiplier tube protection system through a serial port as echo signal intensity information of the protection system; and step 3: after receiving the echo signal intensity information, according to the calculated echo receiving efficiency ratios of different optical receiving channels, by the main control module, performing a precalculation on an echo signal intensity acquired by a second photomultiplier tube and a second back-end processing circuit, connected to the strong light channel, in a current operating state; when it is determined that the photomultiplier tube is able to operate in a normal operating state, inputting a gating start signal to the second photomultiplier tube to make the second photomultiplier tube operate as normal; when it is determined that the photomultiplier tube is in danger of damage, prohibiting the gating start signal from being input, and turning down laser energy; wherein, during operation, current echo signal intensities acquired by a first photomultiplier tube and a first back-end processing circuit as well as the second photomultiplier tube and the second back-end processing circuit are detected in real time, and when a saturated echo signal occurs, the input of the gating start signal is stopped, and an external laser intensity is adjusted to achieve multiple protection of the photomultiplier tube.

* * * * *